United States Patent [19]

Bedell

[11] Patent Number: 4,696,802
[45] Date of Patent: * Sep. 29, 1987

[54] DRILLING GEOTHERMAL WELLS WITH REMOVAL OF $H_2S$

[75] Inventor: Stephen A. Bedell, Lake Jackson, Tex.

[73] Assignee: The Dow Chemical Company, Midland, Mich.

[*] Notice: The portion of the term of this patent subsequent to Dec. 16, 2003 has been disclaimed.

[21] Appl. No.: 802,138

[22] Filed: Nov. 27, 1985

[51] Int. Cl.⁴ .................. C01B 17/04; F03G 7/00
[52] U.S. Cl. ........................ 423/226; 423/224; 423/225; 423/573 R; 423/DIG. 19; 55/73; 210/747; 210/763; 60/641.2
[58] Field of Search ............ 210/758, 763, 698, 701, 210/747; 423/220, 230, 563, 564, 567 R, 575, 573 R, 226; 502/167; 55/73; 60/641.2; 423/224, 225, DIG. 17

[56] References Cited

U.S. PATENT DOCUMENTS

| | | | |
|---|---|---|---|
| 4,009,251 | 2/1977 | Meuly | 210/763 |
| 4,076,621 | 2/1978 | Hardison | 210/698 |
| 4,218,342 | 8/1980 | Thompson | 502/167 |
| 4,361,487 | 11/1982 | Hills | 423/573 R |
| 4,374,104 | 2/1983 | Primack | 423/226 |
| 4,382,918 | 5/1983 | Diaz | 423/573 R |
| 4,414,817 | 11/1983 | Jernigan | 423/573 R |
| 4,421,733 | 12/1983 | Blytas | 423/226 |
| 4,468,929 | 9/1984 | Jernigan | 423/573 R |
| 4,528,817 | 7/1985 | Jernigan | 423/573 R |
| 4,552,668 | 11/1985 | Brown | 210/763 |
| 4,629,608 | 12/1986 | Lampton | 423/226 |

Primary Examiner—Ernest G. Therkorn
Attorney, Agent, or Firm—B. G. Colley

[57] ABSTRACT

Geothermal wells are drilled and the raw steam containing $H_2S$ gas and debris that is released is treated with an aqueous solution containing ferric chelate and one or more water soluble cationic polymeric catalysts to remove substantially all of the $H_2S$ and the debris is removed in a settling zone. The polymeric catalysts accelerate the oxidation of sulfide ions to sulfur solids.

10 Claims, 1 Drawing Figure

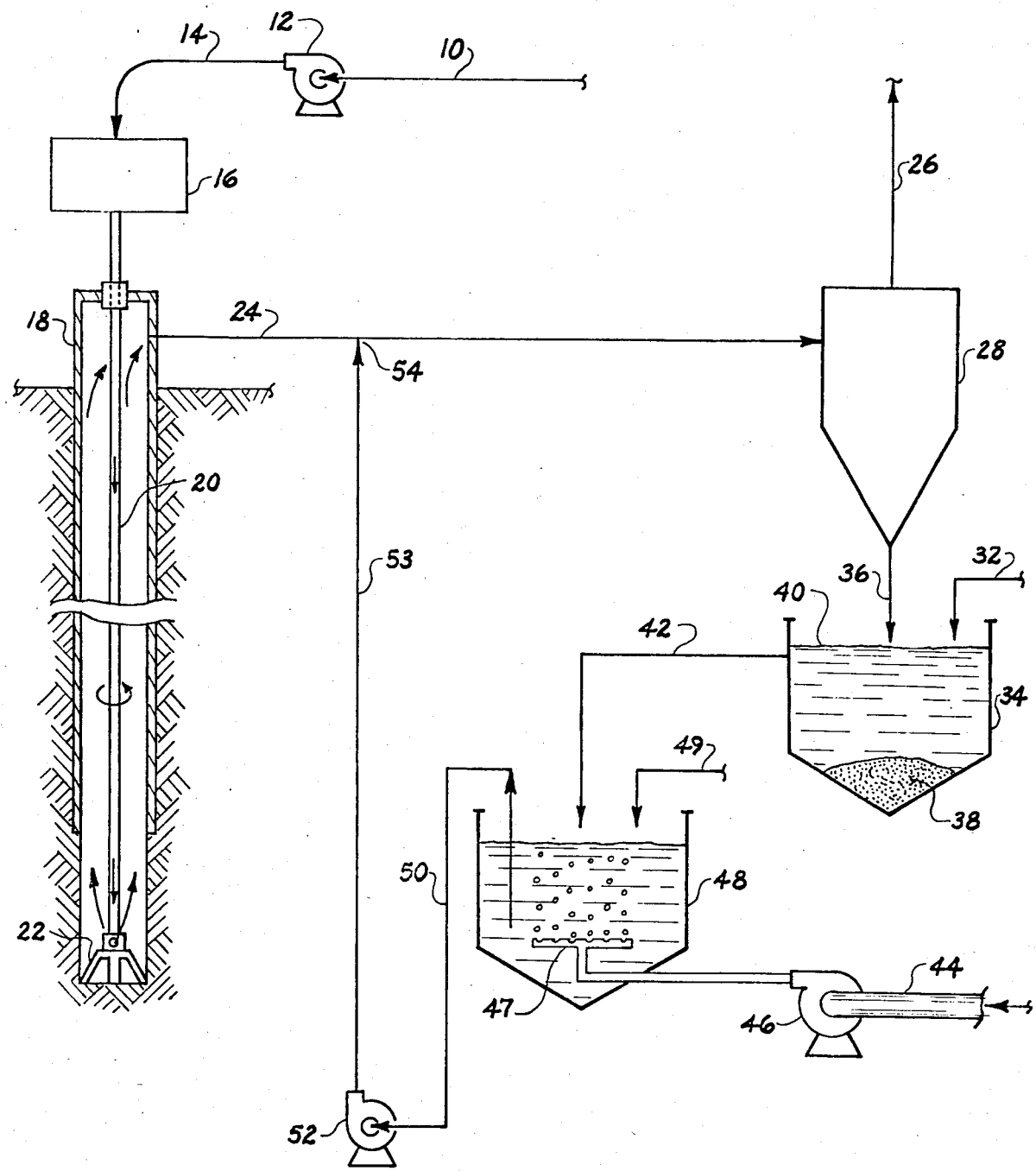

DRILLING GEOTHERMAL WELLS WITH REMOVAL OF H₂S

BACKGROUND OF THE INVENTION

The invention relates to a method for drilling geothermal wells whereby the raw steam produced is treated with ferric chelates to remove substantially all of the hydrogen sulfide gas contained therein.

Geothermal steam wells are drilled with compressed air as the motive force for the drill bit. Due to the high temperatures encountered and highly fractured nature of the reservoirs, drilling mud is not an option. As the drilling enters steam producing areas, the air and steam escape through the casing into a blooie line and muffler. The stringent air pollution standards require that the $H_2S$ in the steam be abated.

Once a well is completed, a flow test is performed. A flow test consists of opening the well full bore and letting it blow through the blooie line. It is during this period that a majority of the need for $H_2S$ abatement occurs. These flow tests last from 30 up to 90 days depending on the experience with the reservoir.

Once wells are in production, they tend to foul as a result of the impurities present in the steam. Eventually, production will drop off and reworking of the well is necessary. Reworking involves bringing a rig in and drilling deeper into another steam producing zone or widening the bore. Again, $H_2S$ abatement is necessary. As they reach an area of steam production, the well is again flow tested. The flow test at this point is much less, from 15 to 30 days. Generally, $H_2S$ abatement requirements are about half that of a new well.

It is known from U.S. Pat. No. 4,151,260 that $H_2S$ gases contained in steam can be abated during the drilling of geothermal wells by treating the steam with an alkaline solution of hydrogen peroxide.

The use of iron chelates to treat exhaust geothermal steam from a steam turbine is taught in U.S. Pat. No. 4,414,817.

It is known from Ser. No. 748,292 filed June 24, 1985 that cationic polymeric catalysts are useful to accelerate the oxidation of $H_2S$ with iron chelates in exhaust steam from geothermal power plants.

SUMMARY OF THE INVENTION

The present invention is a process for treating the raw steam from a geothermal well during the drilling, flow testing, and reworking of the well to remove or abate the $H_2S$ gas contained in the steam before it is released to the atmosphere.

The process of this invention has the following steps:

(A) contacting said raw steam containing entrained solids and $H_2S$ gas with an aqueous solution having 1 to 6 moles of ferric chelate for each mole of $H_2S$ in said steam, an effective amount of one or more water soluble cationic polymeric catalysts and a pH in the range of 7 to 11 whereby $H_2S$ is substantially completely absorbed and converted into sulfur solids and whereby a ferrous chelate solution is generated, (B) separating said ferrous chelate solution from entrained solids, and sulfur solids, (C) converting said ferrous chelate solution with an oxygen containing gas stream into a ferric chelate solution, (D) recycling said ferric chelate solution back to said contacting step for reuse.

The invention is a distinct improvement over the prior use of hydrogen peroxide solutions in that the use of hydrogen peroxide was a single pass operation which was expensive due to the fact that the expensive chemicals had to be transported to remote drilling areas. In contrast with this prior art, the instant invention uses ferric chelant which can be regenerated, recycled, and reused. Due to a small amount of degradation of the chelant, the losses are made up by the addition of fresh ferric chelate but this addition is much more economical than the prior art.

BRIEF DESCRIPTION OF THE DRAWING

The figure of the drawing shows a process wherein the exhaust air from the drilling operation and geothermal steam is conducted by a blooie line to a separator.

In the drawing, a pump 12 pumps air from line 10 into line 14 thru the rotary table 16 and into the hollow drill string 20. The table 16 rotates the drill string 20 and the drill bit 22. The drill cuttings are removed from the well by a combination of the air stream and the geothermal steam. The combination of air and steam exits into a blooie line 24.

At the injection point 54, an aqueous solution of ferric chelate is injected into the blooie line 24. The position of the injection point is carefully chosen so as to make the distance from the separator 28 to the well casing 18 as great as possible. The distance can be shorter provided that adequate mixing is provided by one or more mixing devices such as a static mixer or an equivalent device. This is to insure that there will be adequate time for the $H_2S$ to be absorbed by the solution of ferric chelate and the resulting sulfide ions converted into free sulfur or sulfur solids by the oxidation reaction of the ferric chelate.

The blooie line 24 carries the $H_2S$, steam, air, liquids, debris, etc. into a cyclone separator 28 where the gases are exhausted into the atmosphere by line 26, and the sulfer solids, rock cuttings, and debris are removed by line 36 into a settling tank 34.

In the settling tank 34, the liquid level 40 is maintained above the outlet line 42 so that there is a constant flow of chelate solution from the settling tank 34 into the aeration tank 48. The entrained solids settle out at the bottom of the tank 34 in a sludge pile 38. Inlet line 32 is provided for the addition of ferric chelate solution as needed. If desired, the ferric chelate solution can also be added to tank 48. The same inlet line can be used for the addition of the cationic polymeric catalysts as needed.

The aeration tank 48 is provided with a sparger 47 which is supplied with air by pump 46 and air inlet 44. Inlet line 49 is provided for the addition of a basic solution such as aqueous sodium hydroxide or sodium carbonate solution to adjust or control the pH of the chelate solution.

The sparger 47 in tank 48 oxidizes the ferrous chelate to ferric chelate in a well known manner. If desired, the oxidation process can also be applied to settling tank 34 by the addition of a similar sparger operating from the same air pump 46.

The ferric chelate from aeration tank 48 is withdrawn by line 50 and pump 52 for injection into the blooie line 24 by means of line 53.

DETAILED DESCRIPTION OF THE INVENTION

Chelating agents useful in preparing the ferric chelate of the present invention include those chelating or complexing agents which form a water-solube chelate. Representative of such chelating agents are the aminocarboxylic acids, such as nitrilotriacetic acid, N-hydroxethyliminodiacetic acid, ethylenediaminetetraacetic acid, N-hydroxyethylethylenediaminetriacetic acid, diethylenetriaminepentaacetic acid, cyclohexanediaminetetraacetic acid, triethylenetetraaminehexaacetic acid and the like, including the salts thereof. Another useful chelating agent is lignosulfonate. Of such chelating agents, ethylenediaminetetraacetic acid, N-hydroxethylethylenediaminetriacetic acid and N-hydroxethyliminodiacetic acid, are most advantageously employed in preparing the ferric chelate used herein.

The chelated iron concentrations in the circulating solution should be in the range from 100 to 20,000 ppm of iron and preferably in the range from 1,000 to 3,000 ppm.

Examples of useful cationic polymeric catalysts to be used in this invention are polyethyleneamines, poly(2-hydroxypropyl-1-N-methylammonium chloride) poly(2-hydroxypropyl-1,1-N-dimethyl ammonium chloride), poly[N-(dimethylaminomethyl)]-acrylamide, poly(2-vinylimidazolinum bisulfate), poly(diallyldimethyl ammonium chloride) and poly(N-dimethyl aminopropyl)-methacrylamide. These cationic polymers are well known and are commercially available under various tradenames. See, for example, Commerical Organic Flocculants by J. Vostrcil et al Noyes Data Corp. 1972 which is incorporated by reference herein. Other useful cationic catalysts are set forth in J. Macromol. Science—Chem. A4 pages 1327–1417 (1970) which is also incorporated by reference herein.

The foregoing catalysts are used in the circulating solution at a rate in the range from 25 to 3000 parts per million. A preferred range is 50 to 500 parts per million. The most preferred range is 150 to 300 parts per million. It is to be understood that the above ranges are considered to be effective amounts of the catalyst. The use of amounts less than the above ranges do not generally have the desired affect. The use of amounts more than the above ranges are not economical.

The circulation rate of the chelate solution depends upon the hydrogen sulfide level in the geothermal steam. In general, the circulation rate should be sufficient to provide 1 to 6 moles and preferably 2–4 moles of ferric chelate for every mole of $H_2S$ entering the reaction zone i.e. the blooie line 24.

The contact time of the reactants should be at least 0.05 second or more and preferably in the range from 0.2 to 1.0 seconds.

The pH of the ferric chelate solution should be in the range from 7 to 11 and preferably in the range from 9.5 to 10.5. Below the pH level of 7, the $H_2S$ removal is inadequate and above the level of 11 the solution does not retain the ferric chelate in soluble form.

The entrained solids and debris from the well drilling are separated from the ferrous chelate solution in a separataion zone. In general, a settling tank or vessel must be provided having a capacity such that there is a residence time of the chelate solution in the range from 0.1 to 5 hours and preferably in the range from 1 to 2 hours.

In the aeration or converting zone, air or an oxygen containing gas is sparged in at a rate to provide at least 0.5 mole of oxygen per mole of $H_2S$ being treated. In general, the ratio is from 0.6 to 20.0 moles of oxygen per mole of $H_2S$ and preferably the rate is 1.0 to 10.0 moles of oxygen per mole of $H_2S$.

I claim:

1. A process for the treatment of raw geothermal steam produced during the drilling, flow testing, or reworking of a geothermal well whereby the $H_2S$ gas contained in said steam is abated which comprises the steps of
   (A) contacting said raw steam containing entrained solids and $H_2S$ gas with an aqueous solution having 1 to 6 moles of ferric chelate for each mole of $H_2S$ in said steam, 25 to 3000 parts per million of one or more water soluble cationic polymeric catalysts, and a pH in the range of 7 to 11 whereby $H_2S$ is substantially completely absorbed and rapidly converted into sulfur solids and whereby a ferrous chelate solution is generated.
   (B) separating said ferrous chelate solution from entrained solids, and sulfur solids,
   (C) converting said ferrous chelate solution with an oxygen containing gas stream into a ferric chelate solution,
   (D) recycling said ferric chelate solution back to said contacting step for reuse.

2. The process as set forth in claim 1 wherein the mole ratio of ferric chelate to $H_2S$ is in the range from 2 to 4 and the pH range is 9.5 to 10.5.

3. The process as set forth in claim 1 wherein said separation step involves a residence time of said chelate solution of 0.1 to 5 hours.

4. The process as set forth in claim 1 wherein said conversion step is conducted with an oxygen containing gas at a rate to provide at least 0.5 mole of oxygen per mole of $H_2S$ being treated.

5. The process as set forth in claim 1 wherein said chelate is the ferric chelate of H-hydroxyethylethylenediamine triacetic acid and said polymeric catalyst is poly(dimethyl diallyl) ammonium chloride.

6. A process for the treatment of raw geothermal steam produced during the drilling, flow testing, or reworking of a geothermal well whereby the $H_2S$ gas contained in said steam is abated which comprises the steps of
   (A) contacting said raw steam containing entrained solids and $H_2S$ gas with an aqueous solution having 1 to 6 moles of ferric chelate for each mole of $H_2S$ in said steam wherein said chelate is selected from the group consisting of ethylenediaminetetraacetic acid, N-hydroxyethylethylenediaminetriacetic acid, and N-hydroxyethylaminodiacetic acid, 25 to 3000 parts per million of one or more water soluble cationic polymeric catalysts, and a pH in the range of 7 to 11 whereby $H_2S$ is substantially completely absorbed and converted into sulfur solids and whereby a ferrous chelate solution is generated,
   (B) separating said ferrous chelate solution from entrained solids, and sulfur solids,
   (C) converting said ferrous chelate solution with an oxygen containing gas stream into a ferric chelate solution,
   (D) recycling said ferric chelate solution back to said contacting step for reuse.

7. The process as set forth in claim 6 wherein the mole ratio of ferric chelate to $H_2S$ is in the range from 2 to 4 and the pH range is 9.5 to 10.5.

8. The process as set forth in claim 6 wherein said separation step involves a residence time of said chelate solution of 0.1 to 5 hours.

9. The process as set forth in claim 6 wherein said conversion step is conducted with an oxygen containing gas at a rate to provide at least 0.5 mole of oxygen per mole of $H_2S$ being treated.

10. In a process for the treatment of raw geothermal stream produced during the drilling, flow testing, or reworking of a geothermal well which includes the steps of contacting said raw steam containing $H_2S$ with an aqueous solution of ferric chelate having a pH in the range of 7 to 11 and having 1 to 6 moles of ferric chelate for each mole of $H_2S$ in said stream, separating said chelate solution from entrained solids and sulfur solids, converting said chelate solution with an oxygen containing gas into a ferric chelate solution, and recycling said ferric chelate solution back to said contacting step, the improvement which comprises adding to said chelate solution an effective amount of one or more water soluble cationic polymeric catalysts.

* * * * *